United States Patent
Toyota et al.

[11] Patent Number: 5,946,971
[45] Date of Patent: Sep. 7, 1999

[54] OILING SYSTEM IN POWER TRANSMISSION

[75] Inventors: Hideo Toyota; Masaharu Sakoda, both of Hiroshima-ken, Japan

[73] Assignee: Mazda Motor Corporation, Hiroshima-ken, Japan

[21] Appl. No.: 08/934,135

[22] Filed: Sep. 19, 1997

[30] Foreign Application Priority Data

Sep. 30, 1996 [JP] Japan ................. 8-259796

[51] Int. Cl.$^6$ .............. F16H 57/04; F01M 1/12
[52] U.S. Cl. .............. 74/331; 74/467; 74/606 R; 184/11.2
[58] Field of Search .............. 74/325, 329, 331, 74/606 R, 467; 184/11.2; 384/473, 474

[56] References Cited

U.S. PATENT DOCUMENTS

| | | | |
|---|---|---|---|
| 3,605,946 | 9/1971 | Oehl | 184/11.2 |
| 4,359,909 | 11/1982 | Sogo | 74/467 |
| 4,674,600 | 6/1987 | Takeshita et al. | 184/11.2 X |
| 4,766,773 | 8/1988 | Yamaguchi et al. | 74/467 |
| 5,009,118 | 4/1991 | Raszkowski et al. | 74/331 |
| 5,014,567 | 5/1991 | Horiuchi et al. | |
| 5,158,152 | 10/1992 | Nemoto et al. | 74/467 X |
| 5,509,329 | 4/1996 | Jackson et al. | 74/606 R |

FOREIGN PATENT DOCUMENTS 0 219 240  4/1987  European Pat. Off. .

Primary Examiner—Charles A. Marmor
Assistant Examiner—Scott Lund
Attorney, Agent, or Firm—Sixbey, Friedman, Leedom & Ferguson; Donald R. Studebkaer

[57] ABSTRACT

A manual power transmission includes a transmission casing, input and output shafts coaxially aligned with each other and a layshaft accommodated within the transmission casing and positioned below the input and output shafts. The input and output shaft has a plurality of gears of a varying size or diameter mounted thereon and associated with gear-shifting positions and the layshaft has a corresponding number of countergears of a varying size or diameter mounted thereon and paired with the gears on the input and output shafts. Some of the countergears which serve as an idle gear are so juxtaposed in a direction axially of the layshaft that an envelope enclosing all of the those countergears while touching respective outer perimeters of those remaining countergears represents a generally barrel shape having a generally intermediate portion thereof bulged radially outwardly with respect to the layshaft. A series-connected fluid circuit is provided for supplying a lubricant oil from an oil reservoir at the bottom of the casing back to the oil reservoir through various support means and/or any other portions that require oiling.

13 Claims, 4 Drawing Sheets

OILING SYSTEM IN POWER TRANSMISSION

BACKGROUND OF THE INVENTION

1. Field of the Invention

The present invention generally relates to a power transmission and, more particularly, to a manual power transmission for varying the gear ratio between the automotive engine and drive wheels.

2. Description of the Prior Art

A manual power transmission though orthodox it may be nowadays has again gained popularity because of fun of car maneuverability. Of various manual power transmissions available, the power transmission is well known which comprises an input shaft drivingly coupled with the automotive engine, an output shaft drivingly coupled with the drive wheels and coaxially aligned with the input shaft, a countershaft or layshaft disposed parallel to those shafts, a plurality of speed gear pairs including gears on the input and output shaft and associated countergears on the layshaft, and a reverse idler shaft disposed parallel to any of those shafts and supporting thereon an intermediate idler gear engageable with a reverse-drive gear and a reverse-drive countergear mounted respectively on the input shaft and the layshaft for transmitting the rotation of the input shaft to the layshaft.

The power transmission of the structure described above is generally of a construction in which the drive of the input shaft is transmitted to the layshaft with the rotational speed (rpm) of the input shaft having been adjusted at a predetermined gear ratio determined by mutually meshed speed gears on the input shaft and the layshaft, respectively, and is in turn transmitted from the layshaft to the output shaft at another predetermined gear ratio which varies with the selected gearshift position. This transmission is known as an input reduction gear type that is generally characterized in that reduction in rotational speed takes place between the input shaft and the layshaft.

In this known input reduction gear type, the speed gears are necessarily mounted fixedly on the input shaft and the layshaft, respectively. The rotational speed of the layshaft is reduced according to the gear ratio of the speed gear pair intervening between the input shaft and the layshaft and such gear ratio is substantially fixed regardless of the gearshift position. In other words, the rotational speed of the layshaft is lower than the rotational speed (rpm) of the input shaft regardless of the gearshift position.

On the other hand, a different type of the power transmission is also known in which reduction in rotational speed takes place between the layshaft and the output shaft. This type is known as an output reduction gear type, an example of which is disclosed in, for example, the Japanese Laid-open Patent Publication No. 2-93151, published Apr. 3, 1990 which corresponds to U.S. Pat. No. 5,014,567, issued May 14, 1991. In this known output reduction gear type, since the torque of the input shaft is transmitted to the layshaft without being increased, an input load acting on the various speed gears can be minimized. Also, since no fixed speed gear pair intervene between the input shaft and the layshaft, maneuverability of the gear shifting mechanism will not be affected by any selected gear ratio represented by the speed gear pairs and, therefore, the force required to accomplish a gear shifting can be advantageously minimized. In addition, obnoxious sounds generated by clashing of the gears during the engine idling condition can advantageously be reduced substantially.

In this conventional output reduction gear type, the rotational speed of the layshaft is subject to variation according to the gear ratio of the gear pair selected according to the gearshift position and will, at a certain high-speed gearshift position or positions, attain a value higher than the rotational speed of the input shaft. Thus, for a given gear ratio, the rotational speed of the layshaft is considerably higher at a certain high-speed gearshift or positions in the output reduction gear type than that in the input reduction gear type.

As discussed above, the output reduction gear type has the layshaft that tends to be driven at a higher speed than the input shaft. This feature appears to have brought about the following problems. Particularly, since the rotational speed of the layshaft is extremely high at higher speed gearshift positions as discussed above, speed gears of the various gear pairs which are rotatable idle relative to the shaft on which they are mounted for rotation independent thereof have their associated bearings placed in a difficult lubricating condition during their idle rotation. In particular, the idler gear forming a part of the reverse-drive gear pair, that is, the reverse-drive idler gear, is driven by an intermediate idler gear in a direction counter to the direction of rotation of the shaft supporting the reverse-drive idler gear and the difference in rotational speed relative to such shaft tends to increase considerably. In addition, so far as the first-speed gear pair and the reverse-drive gear pair each having a relatively high gear ratio are concerned, and in particular where one of each gear pair having a smaller gear diameter than the other is utilized as an idler gear, the respective idler gears of those gear pairs will be driven idle relative to the input shaft at a considerably high velocity at the high-speed gearshift position or positions, and therefore, the bearings associated therewith tend to be similarly placed in a difficult lubricating condition, or otherwise the associated bearing for those idler gears will be undesirably seized.

As is well known to those skilled in the art, in the gear-type power transmission regardless of the type, supply of lubricant oil to respective meshing regions of the gears of the various gear pairs, the associated bearings for the idler speed gears and/or any other portions that require oiling is generally carried out by stirring the lubricant oil, accommodated in an oil reservoir at the bottom of the transmission housing, upwardly by means of some of the countergears on the layshaft then driven together with the latter. Most of the lubricant oil so stirred upwardly collides against the interior wall of the transmission housing and subsequently falls by gravity along the interior wall of the transmission housing and is cooled in contact with the interior wall of the transmission housing before it is again supplied to the meshing regions, bearings and/or portions that require oiling.

Where the lubricant oil is to be supplied in the manner described above, the temperature of the lubricant oil has to be taken into consideration as it is affected by the stirring resistance of the lubricant oil imposed by the rotation of both of thelayshaft and the countergears. In order to reduce the stirring resistance to thereby suppress an increase of the lubricant temperature, it is desirable to reduce the amount of the lubricant oil used to a value as small as possible, not exceeding the required amount. Since in the case of the output reduction gear type, the rotational speed of the layshaft is considerably higher at a certain high-speed gearshift position or positions than that in the input reduction gear type as hereinbefore discussed, it is strongly desired that the amount of the lubricant oil be reduced.

However, the need to reduce the amount of the lubricant oil and the assured supply of the lubricant oil to required locations pose an incompatible problem which has hitherto been considered difficult to solve.

SUMMARY OF THE INVENTION

In view of the foregoing, the present invention is intended to provide an improved power transmission which is so designed as to secure a satisfactory and effective lubrication of the component parts of the power transmission.

In order to accomplish this and other objects and features of the present invention, the power transmission herein disclosed has a plurality of gear ratios and comprises a transmission casing having input and output end walls opposite to each other and also having an oil reservoir defined at a bottom thereof for accommodating a quantity of lubricant oil therein. In this transmission, a main shaft means including input and output shafts coaxially aligned with each other and selectively engageable with each other depending on a gearshifting is rotatably supported by the transmission casing through a first support means.

The transmission also comprises a layshaft having first and second ends opposite to each other and rotatably supported by the casing through at least a second support means is disposed within the casing and below the input and output shafts, a speed changing gear assembly including a plurality of speed gears mounted on the input and output shafts and a corresponding number of countergears mounted on the layshaft, one of said speed gears being engageable with the corresponding countergear depending on selection of one of the gear ratios to establish a path of transmission of a drive from the input shaft to the output shaft, and a gear change mechanism for changing the drive transmission path, and a reverse idle shaft juxtaposed to said main shaft means and having a reverse idle gear mounted thereon by means of a third support means for rotation independently thereof and meshed with one of the speed gears of said speed gears on the input shaft and also with one of the countergears on the layshaft. For supplying a lubricant oil to the first to third support means, the transmission further comprises a series-connected fluid circuit means.

In a preferred embodiment of the present invention, the series-connected fluid circuit means runs from the oil reservoir back to the oil reservoir for supplying the lubricant oil, which is stirred upwardly by rotation of the countergears on the layshaft, first to the third bearing on the reverse idle shaft. Preferably, the series-connected fluid circuit means extends from the reverse idle shaft to the layshaft through the input shaft to oil the third bearing, then the first bearing and finally the second bearing in sequence.

The layshaft is preferably positioned at a level lower than the input and output shaft, but higher than the layshaft, in which case the series-connected fluid circuit means includes a first connecting passage extending from the reverse idle shaft to the input shaft and a second connecting passage extending from the input shaft to the layshaft. The first connecting passage is preferably positioned at a level higher than the second connecting passage. Also, the first connecting passage and the second connecting passages are formed generally in opposition to each other with respect to the first bearing so that the lubricant oil can easily flow from the first connecting passage towards the second connecting passage.

Also preferably, the third bearing has a radial size smaller than the radial size of the second bearing which is smaller than the radial size of the first bearing.

The series-connected fluid circuit means may include a generally trough-like oil receptacle for receiving a portion of the lubricant oil which has been stirred upwardly from the oil reservoir. This receptacle extends in a direction axially of the power transmission.

The reverse idle shaft may be supported by a portion of the first end wall of the casing and has an axial passage defined therein in a direction axially thereof and forming a part of the series-connected fluid circuit means.

Preferably, the reverse idle gear is freely rotatably mounted on the reverse idle shaft by means of the third bearing and wherein the lubricant oil flowing in the series-connected fluid circuit means flows through the axial passage to the third bearing. The layshaft may have an axial passage defined therein in a direction axially thereof and forming a part of the series-connecting fluid circuit means to oil the second bearing.

One of the countergears on the layshaft may be freely rotatable relative to the layshaft and is oiled by the lubricant oil supplied through the axial passage defined in the layshaft.

Preferably, the series-connected fluid circuit means is formed in a front cover that is secured to the front end wall of the casing on one side opposite to the oil reservoir.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENT

Figure 1:
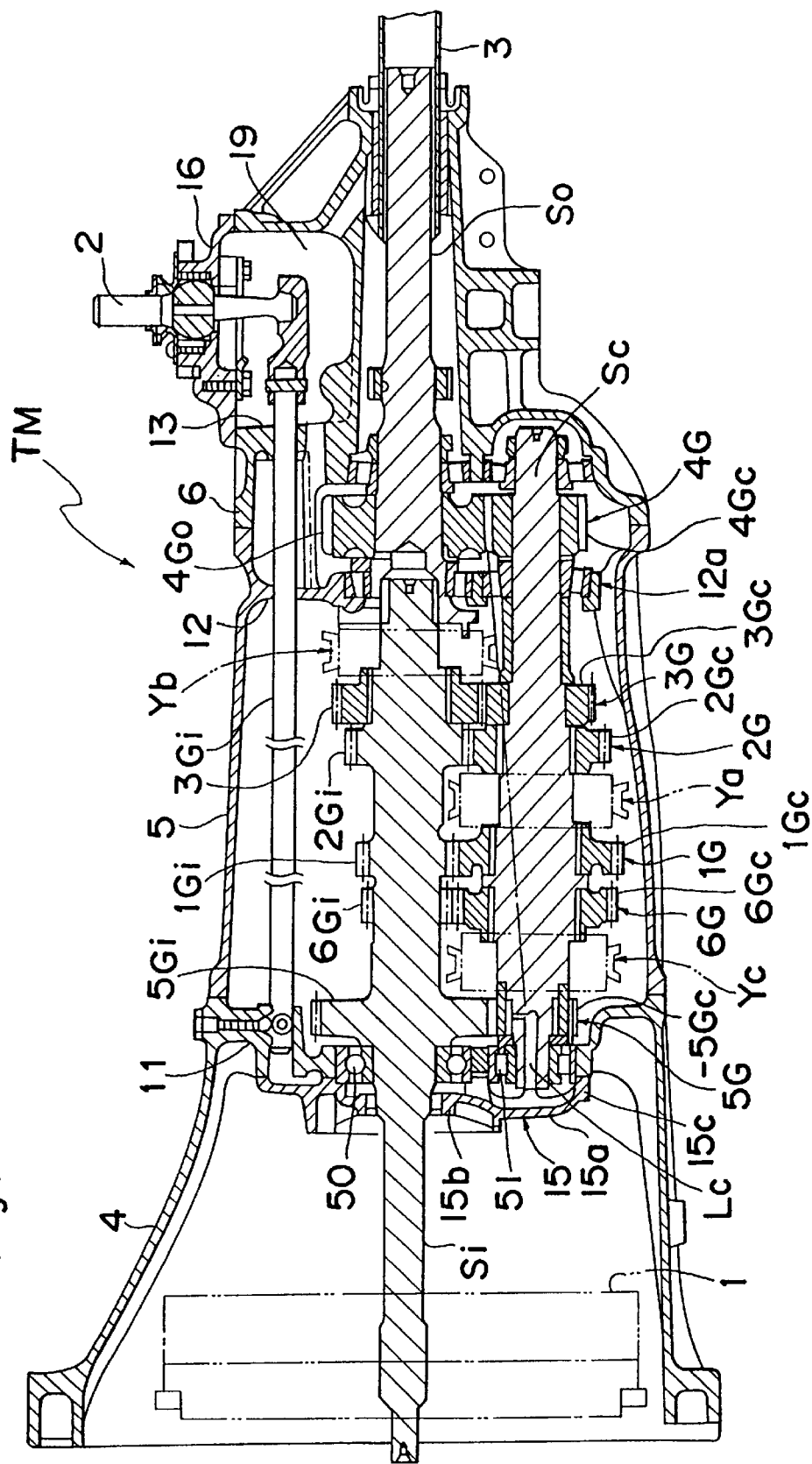
FIG. 1 is a longitudinal sectional view of a power transmission according to a first preferred embodiment of the present invention.

With particular reference to FIG. 1, an overview of an automotive manual power transmission TM embodying the present invention will first be given. The power transmission TM shown in a schematic longitudinal sectional representation therein includes a transmission housing housing therein a main shaft means extending in a direction parallel to the longitudinal sense of the power transmission TM and including an input shaft $Si$ adapted to be drivingly coupled with the engine crankshaft (not shown) through a clutch 1 and an output shaft $So$ coaxially coupled at an input end with the input shaft $Si$ for rotation independently of the input shaft $Si$ and at the opposite, output end with a quill shaft 3 which is in turn drivingly coupled with, for example, a rear wheel axle (not shown) through a known differential gear mechanism. The coupling between the input and output shafts $Si$ and $So$ is accomplished by inserting an output end of the input shaft $So$ into a axial socket defined in the input end of the output shaft $So$ with a needle bearing intervening therebetween. It is also to be noted that a longitudinal axis common to the input and output shafts $Si$ and $So$ is shown by $Ci$ in FIGS. 3 and 7.

The transmission housing is of a three-component type including a clutch casing 4, a transmission casing 5 and an extension casing 6 assembled coaxially together with the transmission casing 5 positioned intermediate between the clutch casing 4 and the extension casing 6. This housing also houses therein a layshaft or countershaft $Sc$ having a longitudinal axis $Cc$ (FIGS. 3 and 7) extending parallel to the input and output shafts $Si$ and $So$ and positioned in part below the input shaft $Si$ and in part below the output shaft $So$, and a plurality of, for example, first to sixth, speed gear pairs 1G to 6G. The first to fifth speed gear pairs 1G, 2G, 3G, 4G and 5G correspond respectively to the 1st-speed to 5th-speed gearshift positions for a gearshift lever 2 whereas the sixth speed gear pair 6G corresponds to the reverse-drive gear-shift position for the gearshift lever 2. The 4th-speed drive is established by a direct coupling of the input shaft $Si$ with the output shaft $So$ for rotation together therewith.

Figure 2:
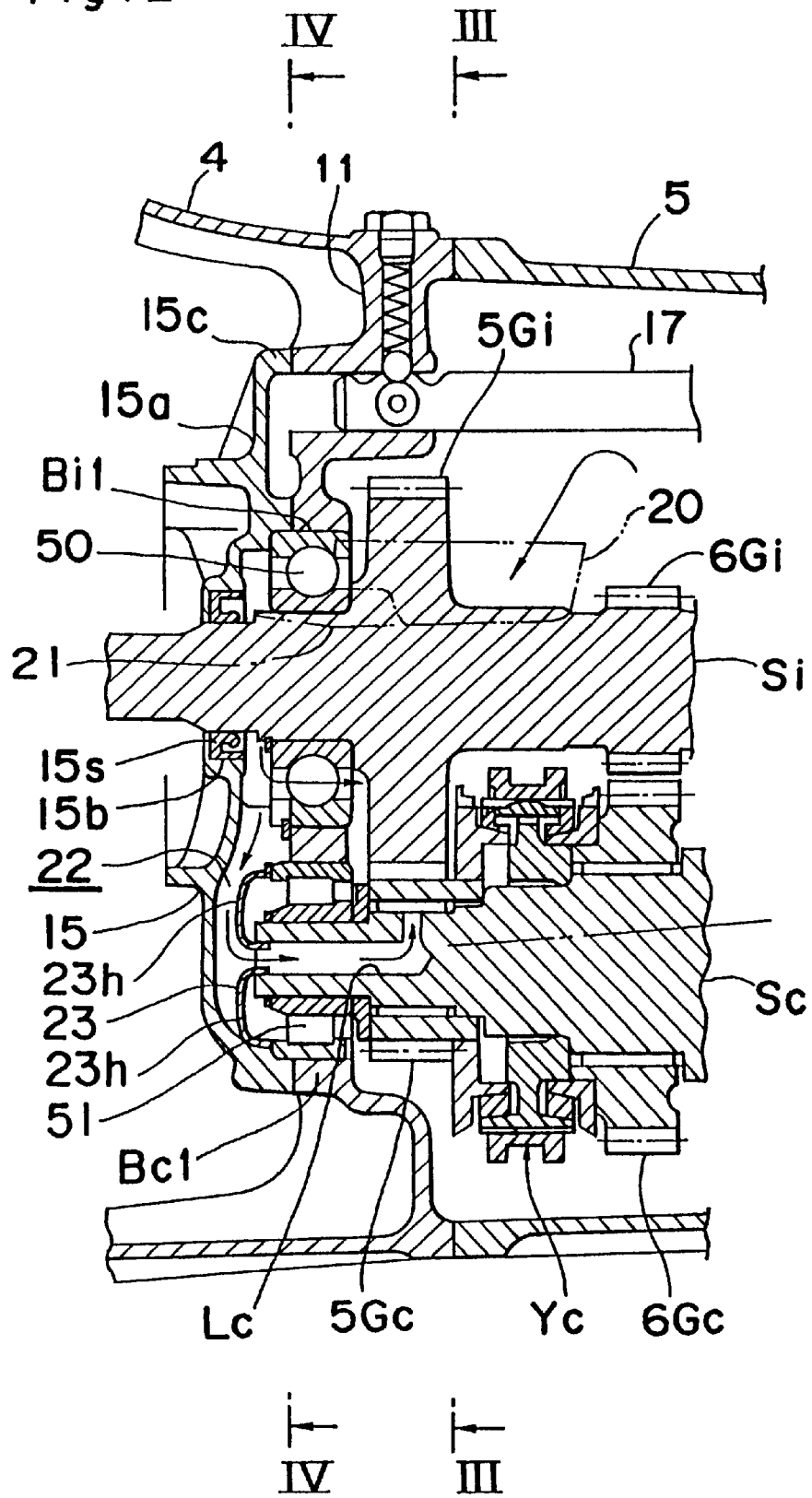
FIG. 2 is a fragmentary longitudinal sectional view, on an enlarged scale, of an input portion of the power transmission shown in FIG. 1.

The transmission housing also has a plurality of, for example, three, bulkheads 11, 12 and 13 formed integrally therewith so as to extend radially inwardly from an inner wall surface thereof and spaced from each other in a direction conforming to the longitudinal sense of the power transmission TM. The front, intermediate and rear bulkheads 11 to 13 carries various support means or bearings for the rotatable support of the input shaft $Si$, the output shaft $So$ and the layshaft $Sc$. Two of the various bearings which are carried by the front bulkhead 11 for the support of the input shaft $Si$ and the layshaft $Sc$, indicated by 50 and 51, respectively, are covered by a front cover 15 secured exteriorly to the front bulkhead 11 as best shown in FIG. 2 and positioned within the clutch casing 4. It is to be noted that in the illustrated embodiment the bearing 50 is employed in the form of a ball bearing and the bearing 51 is in the form of a cylindrical roller bearing as clearly shown in FIG. 2.

A link compartment 19 is defined in the transmission housing, particularly in the extension casing 6, at a location on an output side of the rear bulkhead 13 so as to open upwardly, the opening being, however, closed by a gearshift control cover 16 through which the gearshift lever 2 extends movably. The link compartment 19 accommodates therein a linkage mechanism including three gearshift rods 17 drivingly coupled with a lower end of the gearshift lever 2 in a manner known to those skilled in the art.

Figure 6:
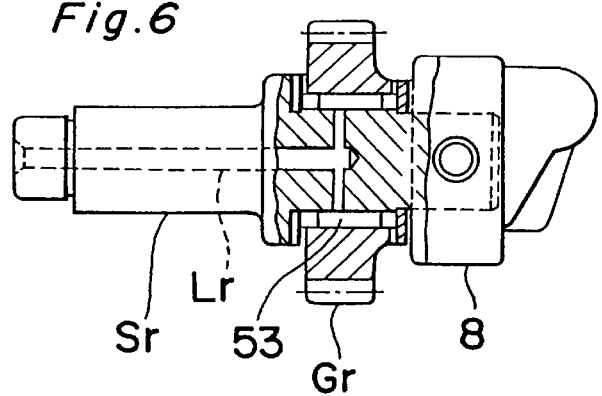
FIG. 6 is a side view, with a portion shown in section, of the reverse idler shaft having an intermediate idler gear mounted thereon.
Figure 5:
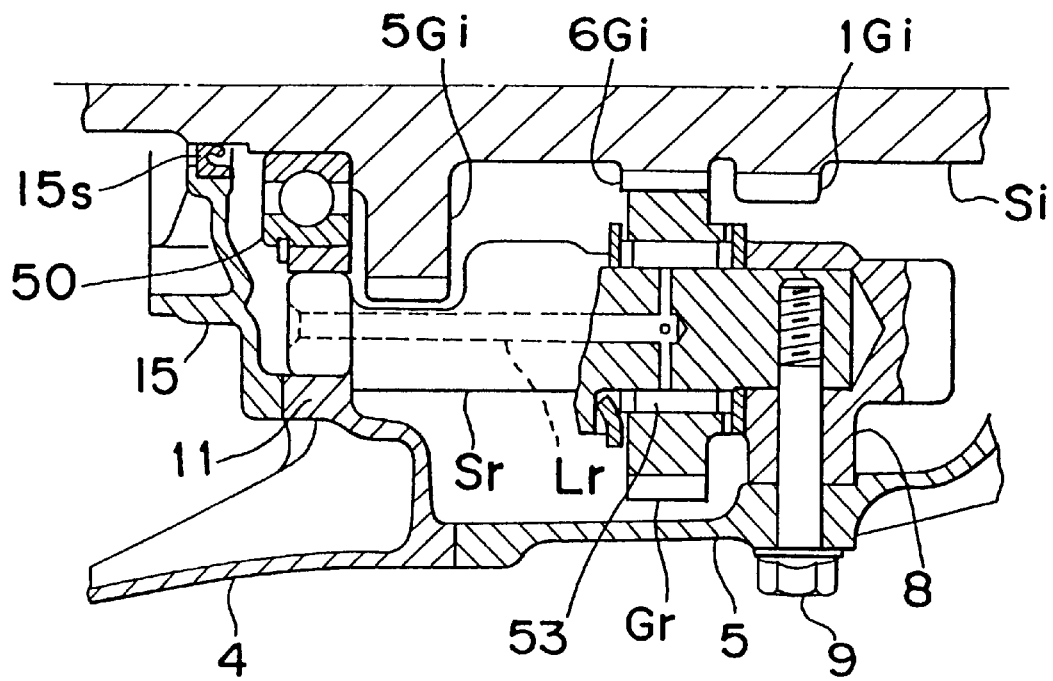
FIG. 5 is a fragmentary longitudinal sectional view, on an enlarged scale, of a different portion of the power transmission as viewed from bottom of FIG. 1, showing the manner in which a reverse idler shaft is mounted to a transmission housing.
Figure 7:
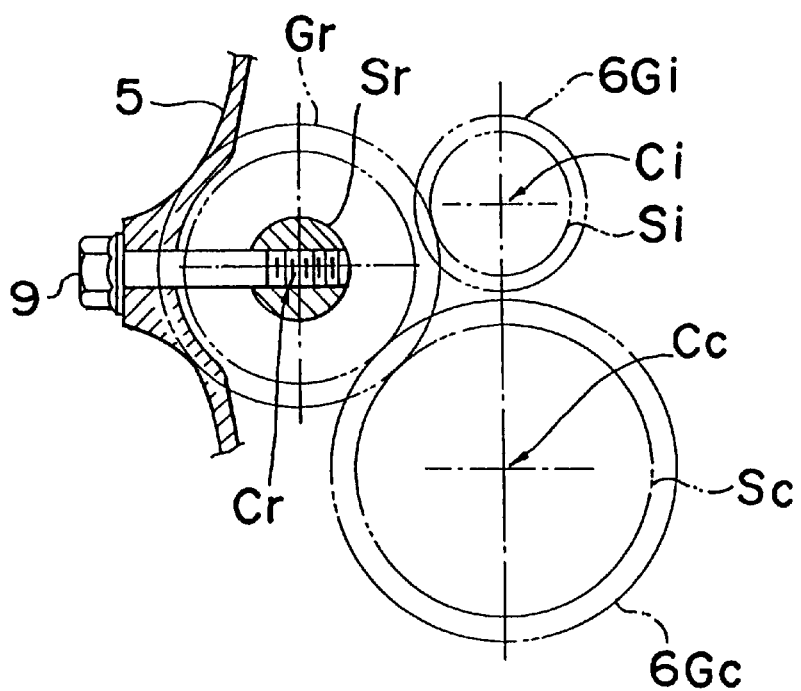
FIG. 7 is a fragmentary sectional view of a further different portion of the power transmission, showing the relationship in position of the reverse idler shaft relative to an input shaft and a layshaft of the power transmission.

The first speed gear pair 1G is comprised of a 1st-speed gear $1Gi$ mounted on the input shaft $Si$ for rotation together therewith and a 1st-speed countergear $1Gc$ mounted on the layshaft $Sc$ for rotation independently thereof and meshed with the 1st-speed gear $1Gi$; the second speed gear pair 2G is comprised of a 2nd-speed gear $2Gi$ mounted on the input shaft $Si$ for rotation together therewith and a 2nd-speed countergear $2Gc$ mounted on the layshaft $Sc$ for rotation independently thereof and meshed with the 2nd-speed gear $2Gi$; the third speed gear pair 3G is comprised of a 3rd-speed gear $3Gi$ mounted on the input shaft $Si$ for rotation independently thereof and a 3rd-speed countergear $3Gc$ mounted on the layshaft $Sc$ for rotation together therewith and meshed with the 3rd-speed gear $3Gi$; the fourth speed gear pair 4G is comprised of an output gear $4Go$ mounted on the output shaft $So$ for rotation together therewith and an output countergear $4Gc$ mounted on the layshaft $Sc$ for rotation together therewith and meshed with the output gear $4Go$; the fifth speed gear pair 5G is comprised of a 5th-speed gear $5Gi$ mounted on the input shaft $Si$ for rotation together therewith and a 5th-speed countergear $5Gc$ mounted on the layshaft $Sc$ for rotation independently thereof and meshed with the 5th-speed gear $5Gi$; and the reverse-drive speed gear pair 6G is comprised of a reverse-drive gear $6Gi$ mounted on the input shaft $Si$ for rotation together-therewith and a reverse-drive countergear $6Gc$ mounted on the layshaft $Sc$ for rotation independently thereof and meshed with the reverse-drive gear $6Gi$ through a reverse idler gear $Gr$ shown in FIGS. 5 to 7 in a manner well known to those skilled in the art.

The illustrated power transmission TM is of a so-called output reduction gear type in which the output gear $4Go$ and the output countergear $4Gc$ forming the fourth speed gear pair 4G are drivingly coupled direct with each other at all times so that when the gearshift lever 2 is set to any one of the 1st-speed, 2nd-speed, 3rd-speed, 5th-speed and reverse-drive gearshift positions the rotation of the layshaft $Sc$ can be transmitted to the output shaft $So$ at a speed determined by a selected gear ratio between the corresponding gear on the input shaft $Si$ and the associated countergear on the layshaft $Sc$, that is, depending on the position of the gearshift lever 2. It is, however, to be noted that when the gearshift lever 2 is set to the 4th-speed gearshift position, the input shaft $Si$ is directly coupled with the output shaft $So$ for driving the output shaft $So$ in synchronism with the input shaft $Si$ and that this rotation of the output shaft $So$ is also transmitted to the layshaft $Sc$ through the fourth speed gear pair 4G to drive the layshaft $Sc$ idle about its own longitudinal axis $Cc$ (FIG. 7). Thus, the 4th-speed gearshift position is a direct-coupling stage in which the input and output shafts $Si$ and $So$ are coupled direct with each other. This fourth speed gear pair 4G is preferably positioned adjacent an output end of the layshaft $Sc$ and the input end of the output shaft $So$.

The gear layout, that is, the manner in which the speed gear pairs 1G to 6G are disposed, employed in the illustrated power transmission TM will now be described. For this purpose, a combination of the fifth speed gear pair 5G and the sixth speed gear pair 6G, a combination of the first speed gear pair 1G and the second speed gear pair 2G and a combination of the third speed gear pair 3G and the fourth speed gear pair 4G are referred to as a 5-R speed gear unit, a 1-2 speed gear unit and a 3-4 speed gear unit, respectively.

Of those speed gear units, the 5-R speed gear unit and the 3-4 speed gear unit are disposed on the input and output sides of the power transmission TM, respectively. In addition, in each of those speed gear units, the sixth speed gear pair 6G, the second speed gear pair 2G or the fourth speed gear pair 4G are disposed on an output side of the fifth speed gear pair 5G, the first speed gear pair 1G or the third speed gear pair 3G, respectively. Thus, it will readily be seen that the illustrated power transmission TM employs such a gear layout that, from the input side to the output side of the power transmission TM, the fifth speed gear pair 5G is followed by the sixth speed gear pair 6G followed by the first speed gear pair 1G followed by the second speed gear pair 2G followed by the third speed gear pair 3G followed by the fourth speed gear pair 4G.

In any event, the power transmission employing the above described gear layout together with speed synchronizers $Ya$, $Yb$ and $Yc$ as will be described later is substantially disclosed in the copending U.S. application Ser.No. 08/821,654 filed Mar. 20, 1997, the disclosure of which is herein incorporated by reference.

Reference will now be made to the reverse-drive speed gear pair 6G comprised of the reverse-drive gear $6Gi$ fixed on the input shaft $Si$, the reverse-drive countergear $6Gc$ rotatable on the layshaft $Sc$ and the reverse idler gear $Gr$ intervening between and meshed with the reverse-drive gear 6G$i$ and the reverse-drive countergear 6G$c$. As best shown in FIG. 5, the reverse idler gear G$r$ is mounted on a reverse idler shaft S$r$ for rotation independently thereof through a bearing 53. The reverse idler shaft S$r$ has a longitudinal axis shown by C$r$ in FIGS. 3 and 7 and is accommodated within the transmission casing 5. This reverse idler shaft S$r$ has one end fixedly supported by a portion of the front bulkhead 11 radially outwardly of the bearing 50 which is a ball bearing and also has the opposite end received in a mounting member 8 which is in turn secured to the transmission casing 5 by means of at least one bolt member 9. For the reason which will become clear from the subsequent description, the reverse idle shaft S$r$ has an axial oil passage L$r$ defined therein in coaxial relation therewith for the flow of a lubricant oil axially and then radially outwardly towards the bearing 53 for the reverse idler gear G$r$ as best shown in FIG. 6.

As best shown in FIG. 7, the reverse idle shaft S$r$ supported in the manner described above is so positioned relative to the input shaft S$i$ and the layshaft S$c$ as to occupy one of the apexes of the shape of a triangle with the remaining apexes occupied respectively by the input shaft S$i$ and the layshaft S$c$. Preferably, the reverse idle shaft S$r$ has its longitudinal axis C$r$ lying at a level a first distance lower than the level of the longitudinal axis C$i$ of the input shaft S$i$, but a second distance higher than the level of the longitudinal axis C$c$ of the layshaft S$c$, said first distance being smaller than the second distance. Also preferably, the bearing 50 for the support of the input shaft S$i$ is of a radial size greater than that of the bearing 51 for the support of the layshaft S$c$ which is in turn greater in radial size than that of the bearing 53 on the reverse idle shaft S$r$.

The 1-2 speed gear unit includes a 1-2 speed synchronizer Y$a$ disposed around the layshaft S$c$ and between the 1st-speed countergear 1 G$c$ and the 2nd-speed countergear 2G$c$ for establishing a drive transmission path selectively between the 1st-speed countergear 1G$c$ and the layshaft S$c$ or between the second-speed countergear 2G$c$ and the layshaft S$c$; the 3-4 speed gear unit includes a 3-4 speed synchronizer Y$b$ mounted around the input shaft S$i$ adjacent the output shaft S$o$ for establishing a drive transmission path selectively between the 3rd-speed 3G$i$ and the input shaft S$i$ or between the input shaft S$i$ and the output shaft S$o$; and the 5-R speed gear unit includes a 5-R speed synchronizer Y$c$ disposed around the layshaft S$c$ and between the 5th-speed countergear 5G$c$ and the reverse-drive countergear 6G$c$ for establishing a drive transmission path selectively between the 5th-speed countergear 5G$c$ and the layshaft S$c$ or between the reverse-drive countergear 6G$c$ and the layshaft S$c$. While both of the 1-2 and 5-R speed synchronizers Y$a$ and Y$c$ are disposed around the layshaft S$c$ because the countergears 1G$c$ and 2G$c$, 5G$c$ and 6G$c$ associated respectively therewith are an idle gear rotatably independent of the shaft on which it is mounted, the 3-4 speed synchronizer Y$b$ is disposed around the input shaft S$i$ because an input gear of the 3-4 speed gear unit, that is, the 3rd-speed gear 3G$i$ is an idle gear rotatable independent of the shaft on which it is mounted.

Each speed synchronizer is so designed and so configured that depending on the direction in which the synchronizer sleeve of the respective speed synchronizer is moved according to the gearshifting, one of the gears on respective sides of the speed synchronizer can be locked to and driven together with the shaft on which those gears are mounted. Referring now to the illustrated embodiment, more specifically, the 1-2 speed synchronizer Y$a$ is operable to selectively lock one of the 1st-speed and 2nd-speed countergears 1G$c$ and 2G$c$ to the layshaft S$c$ when the gearshift lever 2 is moved to the 1st-speed or 2nd-speed gearshift position, respectively; the 3-4 speed synchronizer Y$b$ is operable to selectively lock one of the 3rd-speed 3G$i$ and the input shaft S$i$ to the input shaft S$i$ or the output shaft S$o$ when the gearshift lever 2 is moved to the 3rd-speed or 4th-speed gearshift position, respectively; and the 5-R speed synchronizer Y$c$ operable to selectively lock one of the 5th-speed and reverse-drive countergears 5G$c$ and 6G$c$ to the layshaft S$c$ when the gearshift lever 2 is moved to the 5th-speed or reverse-drive gearshift position, respectively.

In any event, the speed synchronizers employed in the practice of the present invention are of any construction well known to those skilled in the art such as disclosed in, for example, the published European Patent Application No. 219,240-A1 or U.S. Pat. No. 5,014,567, reference to which are herein incorporated by reference, and no further detail thereof will be herein reiterated for the sake of brevity.

As hereinbefore described, the illustrated power transmission TM is of the output reduction gear type in which the output gear 4G$o$ and the output countergear 4G$c$ forming the fourth speed gear pair 4G are drivingly coupled direct with each other, with the output gear 4G$o$ rotatable relative to the input shaft S$i$, and also in which the layshaft S$c$ will not be driven idle when the gearshift lever 2 is set to a neutral position such as effected during an engine idling condition. However, unlike the input reduction type in which the layshaft is driven at a speed proportional to, but lower than that of the input shaft, the output reduction type has such a characteristic that the rotational speed of the layshaft S$c$ tends to become considerably higher at a certain high-speed gearshift position or positions than that in the input reduction gear type.

If the rotational speed of the layshaft S$c$ in the output reduction type increases, the countergears 1G$c$, 2G$c$, 5G$c$ and 6G$c$ all mounted on the layshaft S$c$ for rotation independent thereof and therefore serving as idler gears have their associated bearings which are placed in a difficult lubricating condition during their idle rotation. More specifically, considering that the reverse-drive countergear 6G$c$ is driven in a direction counter to the direction of rotation of the layshaft S$c$ because of the reverse idler gear G$r$ intervening between it and the reverse-drive gear 6G$i$ on the input shaft S$i$, increase in rotational speed of the layshaft S$c$ results in a considerable increase in rotational speed of the reverse-drive countergear 6G$c$ relative to the layshaft S$c$ to such an extent as to result in undesirable problems associated with gear-to-shaft seizing.

Particularly where considering that both of the reverse-drive speed gear pair 6G and the first speed gear pair 1G give rise to a relatively high gear ratio, one of the speed gears of each of the sixth or reverse-drive gear pair 6G and the first gear pair 1G which has a smaller diameter than the other of those gears, that is, the reverse-drive or 1st-speed gear 6G$i$ or 1G$i$, serves as an idler gear rotatable independently of the shaft on which it is mounted, the rotational speed of such idler gear relative to the shaft on which it is mounted during the idle rotation of such shaft tends to become considerably high when a certain high-speed gearshift position or positions are selected, and the bearing for each of those speed gears is often placed in a difficult lubricating condition.

Accordingly, if all of the speed synchronizers are disposed on the input shaft such as in the conventional type, for example, the power transmission disclosed in EP 0 219 240-A1 referred to hereinbefore, all of the speed gears on the input shaft must be idler gears rotatable relative to the input shaft. Hence, so far as any one of the first speed gear pair and the sixth speed gear pair (the reverse-drive gear pair) both having a higher gear ratio than any other speed gear pairs is concerned, one of the speed gears forming the first or sixth speed gear pairs which has a smaller gear diameter than that of the other of those speed gears must also be an idler gear rotatable relative to the input shaft. In this case, if the rotational speed of the layshaft increases as hereinbefore described, the rotational speed of this idler gear relative to the input shaft during the idle rotation thereof will become considerably high to such an extent as to result in undesirable problem associated with gear-to-shaft seizing as hereinbefore discussed. Particularly when it comes to the case of the reverse-drive gear then mounted freely rotatably on the input shaft, the reverse-drive idler gear is to be driven in a direction counter to the input shaft by the action of the reverse idler gear, exhibiting a considerable different in relative rotational speed between it and the input shaft.

Because of the reason discussed above, in the illustrated embodiment of the present invention, the 5-R speed synchronizer Yb for selectively engaging one of the 5th-speed countergear 5Gc and the reverse-drive countergear 6Gc with the layshaft Sc and the 1-2 speed synchronizer Ya for selectively engaging one of the 1st-speed countergear 1Gc and the second-speed countergear 2Gc with the layshaft Sc are disposed on the layshaft Sc as hereinbefore described so that one of the speed gears of each of the sixth or reverse-drive gear pair 6G and the first gear pair 1G which has a smaller diameter than the other of those gears, that is, the reverse-drive or 1st-speed gear 6Gi or 1Gi, can be fixedly mounted on the input shaft Si for rotation together therewith. Accordingly, those gears 6Gi and 1Gi can be driven at a predetermined rotational speed equal to the rotational speed of the input shaft Si at all times.

On the other hand, the other of those speed gears of each gear pair 6G or 1G which has a greater diameter, that is, the reverse-drive or 1st-speed countergear 6Gc or 1Gc, is mounted on the layshaft Sc as an idler speed gear rotatable independent of the layshaft Sc and, therefore, exhibits a rotational speed lower relative to the layshaft Sc than that exhibited by the speed gear 6Gi or 1Gi. Accordingly, such a considerable difference in rotational speed as occurring when in the output reduction gear type the speed synchronizers Ya and Yc would be disposed on the input shaft Si does not occur between the input shaft Si and the idler speed gear of each of the reverse-drive gear pair 6G and the lst-speed gear pair 1G.

However, since in the output reduction gear type the rotational speed of the layshaft Sc is extremely high at higher speed gearshift positions as discussed above, the countergears 1Gc, 2Gc, 5Gc and 6Gc all mounted on the layshaft Sc for rotation independent thereof and therefore serving as idler gears have their associated bearings which are placed in a difficult lubricating condition during their idle rotation. This is particularly true of the 5th-speed countergear 5Gc which has the smallest gear diameter of the countergears. Also, the bearing for the reverse idler gear Gr intervening between the reverse-drive gear 6Gi, fixed on the input shaft Si, and the reverse-drive countergear 6Gc rotatable on the layshaft Sc requires a carefully designed lubricant supply system through which a lubricant oil can be assuredly supplied to the bearing for the reverse idler gear Gr.

As is the case with the conventional manual power transmission, even the power transmission TM herein disclosed has a quantity of lubricant oil accommodated within an oil reservoir, defined in a bottom region of the transmission housing, to a predetermined level shown by the linear phantom line in FIG. 1. Supply of the lubricant oil to respective meshing regions of the gears of the various gear pairs 1G to 6G, the associated bearings for the idler speed gears 1Gi to 1G3, 5Gi and 6Gi on the input shaft Si and/or any other portions that require oiling is carried out by stirring it upwardly by means of some of the countergears on the layshaft Sc then driven together with the latter. Most of the lubricant oil so stirred upwardly collides against the interior wall of the transmission casing 10 and subsequently falls by gravity along the interior wall of the transmission casing 10 and is cooled in contact with the interior wall of the transmission casing 10 before it is again supplied to the regions, bearings and/or portions that require oiling.

It is to be noted that the phantom line in FIG. 1 depicting the top surface level of the lubricant oil accommodated within the oil reservoir at the bottom of the transmission casing 10 is depicted as inclined relative to any one of the shafts Si, So and Sc. This is because, when the power transmission TM in the illustrated embodiment is incorporated in an automotive vehicle, the power transmission TM is mounted on a vehicle chassis in a tilted fashion with the clutch casing 4 positioned at a level higher than the extension casing 6.

The intermediate bulkhead 12 which may be an integral part of the transmission casing 5 has a lower peripheral portion radially inwardly depleted at 12a to define a bottom oil passage in cooperation with a bottom wall area of the transmission casing 5. This bottom oil passage 12a facilitates a free flow of the lubricant oil between a portion of the oil reservoir below the countergears 1Gc to 3Gc, 5Gc and 6Gc and another portion of the oil reservoir below the countergear 4Gc.

Where the lubricant oil is to be supplied in the manner described above, the stirring resistance has to be reduced to thereby suppress a possible increase of the lubricant temperature. To accomplish this, it is desirable to reduce the amount of the lubricant oil used to a value as small as possible, not exceeding the required amount. Since in the case of the output reduction gear type, the rotational speed of the layshaft is considerably higher at a certain high-speed gearshift position or positions than that in the input reduction gear type as hereinbefore discussed, it is strongly desired that the amount of the lubricant oil be reduced.

According to the preferred embodiment of the present invention, the oiling system used in the power transmission TM is so uniquely designed as to accomplish a reduction in amount of the lubricant oil used and also a reliable supply of the lubricant oil to respective meshing regions of the gears of the various gear pairs 1G to 6G, the associated bearings for the idler speed gears 1Gi to 1G3, 5Gi and 6Gi on the input shaft Si and/or any other portions that require oiling. More specifically, the oiling system which will subsequently be detailed is so configured that the lubricant oil can flow from the oil reservoir back to the oil reservoir along a series-connected fluid circuit running from the reverse idle shaft Sr to the layshaft Sc via the input and output shafts Si and So.

Figure 3:
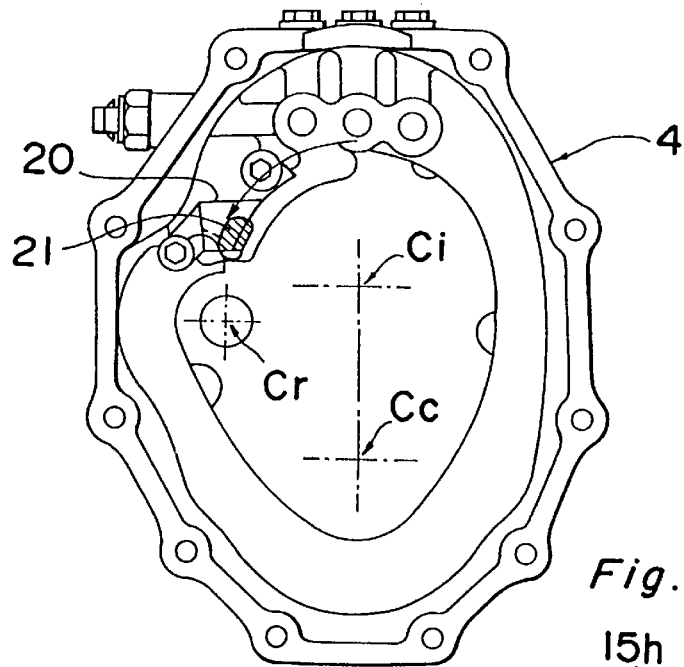
FIGS. 3 and 4 are cross-sectional views taken along the lines III—III and IV—IV in FIG. 2, respectively.

More specifically, referring to FIGS. 2 and 3, a generally troughlike oil receptacle 20 for receiving a portion of the lubricant oil in a manner as will be described later is interiorly secured to the clutch housing 4 at a location substantially diagonally upwardly of the 5th-speed gear 5Gi fixed on the input shaft Si and generally above the reverse idler shaft Sr. The oil receptacle 20 is utilized to collect that portion of the lubricant oil which has been stirred upwardly from the bottom region of the transmission housing by means of some of the countergears on the layshaft S*c* then driven together with the latter. The clutch casing 4 has a connecting passage 21 defined therein and communicated with an oil chamber 22 which is delimited by the front bulkhead 11, the bearings 50 and 51 carried by the bulkhead 11, and the front cover 15.

Figure 4:
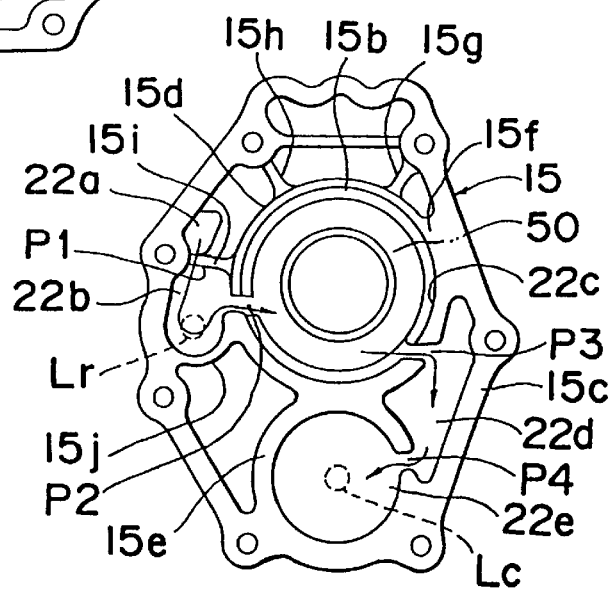

The front cover 15 is capped to the front bulkhead 11 to define a compartment between an inner surface thereof and the front bulkhead 11. This front cover 15 includes, as shown in FIGS. 2 and 4, an end wall 15*a* lying generally parallel to the front bulkhead 11 and having a through-hole 15*b* defined therein for the passage of the front end portion of the input shaft S*i* therethrough by means of an oil seal 15*s*, and a peripheral wall 15*c* protruding generally transversely from an outer peripheral edge of the end wall 15*a* towards the front bulkhead 11. The end wall 15*a* is integrally formed with an upper cylindrical wall 15*d* coaxial with the through-hole 15*b*, a lower cylindrical wall 15*e* positioned below the upper cylindrical wall 15*d*, and a plurality of radial walls 15*f*, 15*g*, 15*h*, 15*i* and 15*j* extending between the peripheral wall 15*c* and the upper cylindrical wall 15*d*, all of said walls 15*d* to 15*j* protruding from the end wall 15*a* towards the front bulkhead 11.

As best shown in FIG. 4, the oil chamber 22 referred to above is made up of a first oil pocket 22*a* communicated with the oil receptacle 20 through the connecting passage 21, a second oil pocket 22*b* communicated with the axial oil passage L*r* in the reverse idle shaft S*r*, a third oil pocket 22*c* around the input shaft S*i*, a fourth oil pocket 22*d*, and a fifth oil pocket 22*e* aligned with the layshaft L*c*. The first oil pocket 22*a* is delimited by the walls 15*a*, 15*c*, 15*d*, 15*h* and 15*i*; the second oil pocket 22*b* is delimited by the walls 15*a*, 15*c*, 15*d*, 15*i* and 15*j*; the third oil pocket 22*c* is delimited by the walls 15*a* and 15*d* in cooperation with the bearing 50 and defined inside the cylindrical wall 15*d*; the fourth oil pocket 22*d* is defined by the walls 15*a*, 15*c*, 15*d*, 15*f* and 15*e* and positioned between the third and fifth oil pockets 22*c* and 22*e*; and the fifth oil pocket 22*e* is delimited by the walls 15*a* and 15*e* in cooperation with a front end face of the layshaft S*c* and the bearing 51 and defined inside the lower cylindrical wall 15*e*.

To establish the series-connected fluid circuit running from the reverse idle shaft S*r* to the layshaft S*c* via the input and output shafts S*i* and S*o*, the first oil pocket 22*a* is communicated with the second oil pocket 22*b* through a first connecting passage P1 defined in the radial wall 15*i*; the second oil pocket 22*b* is communicated with the third oil pocket 22*c* through a second connecting passage P2 defined in the upper cylindrical wall 15*d*; the third oil pocket 22*c* is communicated with the fourth oil pocket 22*d* through a third connecting passage P3 defined in the upper cylindrical wall 15*d* at a location generally opposite to the second connecting passage P2; the fourth oil pocket 22*d* is communicated with the fifth oil pocket 22*e* through a fourth connecting passage P4 defined in the lower cylindrical wall 15*e*.

As best shown in FIG. 2, the layshaft S*c* has a generally L-shaped oil passage L*c* defined therein so as to extend from a front end face thereof towards the 5th-speed countergear 5G*c* so that the lubricant oil within-the fifth oil pocket 22*e* can be supplied to the 5th-speed countergear 5G*c* to lubricate the latter. The lubricating oil which has been used to oil the 5thspeed countergear 5G*c* subsequently falls downwardly by gravity into the oil reservoir within the bottom region of the transmission housing and is hence recovered back to the oil reservoir. A generally U-sectioned annular sealing member 23 is fitted so as to straddle between an outer race of the bearing 51 and an entrance leading to the L-shaped oil passage L*c* to facilitate an assured flow of the lubricant oil from the fifth oil pocket 22*e* into the L-shaped oil passage L*c*. Considering that the bearing 51 requires oiling, however, the annular sealing member 23 is formed with a plurality of minute perforations 23*h* so that a portion of the lubricant oil within the fifth oil pocket 22*e* can flow in between the inner and outer races of the bearing 51.

The oiling system functions in a manner which will now be described. The lubricant oil within the oil reservoir is, so long as the gearshift lever 2 is set to any one of the gearshift positions other than the neutral and parking positions, is stirred upwardly by means of some of the countergears then driven together with the layshaft S*c*. Most of the lubricant oil so stirred upwardly collides against the interior wall of the transmission casing 5 and is subsequently collected by the oil receptacle 20. The lubricant oil collected in the oil receptacle 20 flows into the second oil pocket 22*b* through the first oil pocket 22*a* by way of the first connecting passage P1 and then into the axial oil passage L*r* in the reverse idle shaft S*r* to lubricate the bearing 53 for the reverse idler gear G*r*.

Since the reverse idle shaft S*r* is so positioned with its longitudinal axis C*r* held at a level lower than the level of the longitudinal axis C*i* of the input shaft S*i*, but higher than the level of the longitudinal axis C*c* of the layshaft S*c* as hereinbefore described, the lubricant oil supplied into the second oil pocket 22*b* can, after filling up the axial oil passage L*r* in the reverse idle shaft S*r*, overflow therefrom into the third oil pocket 22*c* through the second connecting passage P2 to lubricate the bearing 50 for the input shaft S*i*. After the bearing 50 has been lubricated, the lubricant oil further flows into the fourth oil pocket 22*d* through the third connecting passage P3 and then from the fourth oil pocket 22*d* into the fifth oil pocket 22*e* through the fourth connecting passage P4. The lubricant oil entering the fifth oil pocket 22*e* subsequently flows into the L-shaped oil passage L*c* in the layshaft S*c* to lubricate the 5th-speed countergear 5G*c*. The lubricant oil within the fifth oil pocket 22*e* also lubricates the bearing 51 for the layshaft S*c* through the minute perforations 23*h* in the annular sealing member 23. After the 5th-speed countergear 5G*c* and the bearing 53 have been oiled, the lubricant oil returns to the oil reservoir.

It is to be noted that during the flow of the lubricant oil within the oil chamber 22, the lubricant oil can be cooled in contact with the walls, particularly the end wall, of the front cover 15.

As hereinbefore fully described, the oiling system used in the power transmission TM in accordance with the present invention makes use of the series-connected fluid circuit running from the reverse idle shaft S*r* to the layshaft S*c* via the input and output shafts S*i* and S*o* to supply the lubricant oil to the bearings for some of the idler speed gears and also for the input shaft and the layshaft all that require oiling. Accordingly, even though the amount of the lubricant oil accommodated within the oil reservoir is reduced to a certain extent, it is possible to accomplish a reliable supply of the lubricant oil to the various locations where oiling is required. In other words, according to the present invention, both of the reduction in amount of the lubricant oil to be accommodated within the oil reservoir and the reliable supply of the lubricant oil, which have been considered incompatible to accomplish, can advantageously accomplished.

Consequently, increase of the stirring resistance of the lubricant oil brought about by rotation of the layshaft and the countergears on such layshaft can advantageously be suppressed to thereby suppress a possible increase of the temperature of the lubricant oil and also to suppress any possible reduction in power transmission efficiency.

The above discussed advantages are paramount where the power transmission is of a type wherein the number of revolution of the layshaft is relatively high accompanied by an increase of the oil stirring resistance such as the output reduction type. In particular, the lubricant oil within the oil reservoir is first supplied to the reverse idle shaft, and therefore, the bearing for the reverse idle gear on the reverse idle shaft which has hitherto been difficult to oil in the case of the output reduction type can assuredly be oiled to thereby minimize the possibility of occurrence of the gear-to-shaft seizing.

In any event, the oiling system according to the present invention is so designed as to allow the lubricant oil to flow sequentially from one of the shafts which has been considered most difficult to oil before it returns to the oil reservoir. This oiling system is effective to minimize any possible occurrence of the gear-to-shaft seizing.

Although the present invention has been described in connection with the preferred embodiments thereof, it should be noted that various hanges and modifications are apparent to those skilled in the art. For example, since a major part of the series-connected fluid circuit is formed in the front cover which is separate from the transmission housing, replacement of the front cover having the specific oil path makes it possible to allow the lubricant oil to flow along a different oil path in the power transmission.

Also, the idea of supplying the lubricant oil along the series-connected fluid circuit such as hereinbefore disclosed, although described as applied to the output reduction type, can equally be applied to any other gear-type transmission such as, for example, the input reduction type.

Accordingly, such changes and modifications so far as encompassed by the appended claims are to be understood as included within the scope of the present invention.

What is claimed is:

1. A power transmission having a plurality of gear ratios, said power transmission comprising:

a transmission casing having input and output end walls opposite to each other and also having an oil reservoir defined at a bottom thereof, said oil reservoir accommodating a quantity of lubricant oil therein;

an input shaft rotatably supported by the transmission casing through a first support means, and an output shaft coaxially aligned with the input shaft;

a layshaft having first and second ends opposite to each other and disposed within the casing with said layshaft positioned at a lower level than said input shaft with respect to said bottom of said transmission casing, said layshaft being rotatably supported by the transmission casing through at least a second support means;

a speed changing gear assembly including a plurality of speed gears mounted on the input and output shafts and a corresponding number of countergears mounted on the layshaft, one of said speed gears being engageable with an associated one of the counteriears depending on selection of one of the gear ratios to establish a path of transmission of a drive from the input shaft to the output shaft, and a gear change mechanism for changing the drive transmission path;

a reverse idle shaft positioned laterally of said input shaft and generally intermediate said input shaft and said layshaft and offset towards said input shaft, said reverse idle shaft having a reverse idle gear mounted thereon by means of a third support means for rotation independently thereof and meshed with one of the speed gears of said speed gears on the input shaft and also with one of the countergears on the layshaft; and a series-connected fluid circuit means for supplying the lubricant oil to the third support means then to the first support means and then to the second support means.

2. A power transmission having a plurality of gear ratios, said power transmission comprising:

a transmission casing having input and output end walls opposite to each other and also having an oil reservoir defined at a bottom thereof between said input and output end walls, said oil reservoir accommodating a quantity of lubricant oil therein;

an input shaft support means and a layshaft support means both mounted on the input end wall of the casing;

an input shaft having first and second ends opposite to each other and rotatably supported by the input shaft support means with the first and second ends thereof positioned inside and outside of the casing, respectively;

an output shaft having first and second ends opposite to each other with the first and second ends thereof positioned inside and outside of the casing, said input and output shafts being coaxially connected with each other for rotation independently thereof;

a layshaft having first and second ends opposite to each other within the casing and positioned at a lower level than said input shaft with respect to said bottom of said casing with said layshaft extending parallel to any one of the input and output shafts, said layshaft being rotatably supported by the layshaft support means;

a speed changing gear assembly including a plurality of speed gears mounted on the input and output shafts and a corresponding number of countergears mounted on the layshaft, one of said speed gears being engageable with an associated one of the countergears depending on selection of one of the gear ratios to establish a path of transmission of a drive from the input shaft to the output shaft, and a gear change mechanism for changing the drive transmission path;

a reverse idle shaft positioned laterally of said input shaft and generally intermediate said input shaft and said layshaft and offset towards said input shaft;

a gear support means mounted on the reverse idle shaft;

a reverse idle gear mounted on the reverse idle shaft through the gear support means, said reverse idle gear being meshed with one of the speed gears of said speed gears on the input shaft and also with one of the countergears on the layshaft; and a series-connected fluid circuit means running from the oil reservoir back to the oil reservoir for supplying the lubricant oil, which is stirred upwardly by rotation of the countergears on the layshaft, first to the gear support means on the reverse idle shaft.

3. The power transmission as claimed in claim 2, wherein said series-connected fluid circuit means extends from the reverse idle shaft to the layshaft through a third oil pocket to oil the gear support means, the input shaft support means and the layshaft support means in sequence.

4. The power transmission as claimed in claim 3, wherein the reverse idle shaft is positioned at a level lower than the input and output shafts, but higher than the layshaft and wherein said series-connected fluid circuit means includes a first connecting passage extending from the reverse idle shaft to the input shaft and a second connecting passage extending form the input shaft to the layshaft, said first connecting passage being positioned at a level higher than the second connecting passage.

5. The power transmission as claimed in claim 4, wherein said first connecting passage and said second connecting passage are formed generally in opposition to each together with respect to the input shaft support means.

6. The power transmission as claimed in claim 5, wherein said gear support means has a radial size smaller than a radial size of the layshaft support means which is smaller than a radial size of the input shaft support means.

7. The power transmission as claimed in claim 2, wherein said series-connected fluid circuit means includes an oil receptacle for receiving a portion ofthe lubricant oil which has been stirred upwardly from the oil reservoir, said receptacle extending in a direction axially of the power transmission.

8. The power transmission as claimed in claim 2, wherein said reverse idle shaft is supported by a portion of the input end wall of the casing and has an axial passage defined therein in a direction axially thereof, said axial passage forming a part of the series-connected fluid circuit means.

9. The power transmission as claimed in claim 8, wherein said reverse idle gear is freely rotatably mounted on the reverse idle shaft by means of the gear support means and wherein the lubricant oil flowing in the series-connected fluid circuit means flows through the axial passage to the gear support means.

10. The power transmission as claimed in claim 2, wherein the layshaft has an axial passage defined therein in a direction axially thereof, said axial passage forming a part of the series connected fluid circuit means.

11. The power transmission as claimed in claim 10, wherein one of the countergears on the layshaft is freely rotatable relative to the layshaft and is oiled by the lubricant oil supplied through the axial passage defined in the layshaft.

12. The power transmission as claimed in claim 2, wherein said series-connected fluid circuit means is formed in a front cover that is secured to the input end wall of the casing on one side opposite to the oil reservoir.

13. The power transmission as claimed in claim 2, wherein the output shaft rotates slower than the layshaft.

* * * * *